(12) United States Patent
Victor

(10) Patent No.: US 10,649,809 B2
(45) Date of Patent: May 12, 2020

(54) FORK-AWARE SMART POINTERS

(71) Applicant: JPMorgan Chase Bank, N.A., New York, NY (US)

(72) Inventor: Michel Victor, Sunnyside, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/058,093

(22) Filed: Aug. 8, 2018

(65) Prior Publication Data
US 2020/0050489 A1  Feb. 13, 2020

(51) Int. Cl.
*G06F 9/50* (2006.01)
*G06F 9/48* (2006.01)

(52) U.S. Cl.
CPC .............. *G06F 9/50* (2013.01); *G06F 9/48* (2013.01); *G06F 9/485* (2013.01); *G06F 9/4806* (2013.01); *G06F 9/4843* (2013.01); *G06F 9/4881* (2013.01); *G06F 9/5005* (2013.01); *G06F 9/5011* (2013.01); *G06F 9/5016* (2013.01); *G06F 9/5022* (2013.01); *G06F 9/5027* (2013.01)

(58) Field of Classification Search
CPC ........ G06F 9/48; G06F 9/4806; G06F 9/4843; G06F 9/485; G06F 9/4881; G06F 9/50; G06F 9/5005; G06F 9/5011; G06F 9/5016; G06F 9/5022; G06F 9/5027
See application file for complete search history.

(56) References Cited

U.S. PATENT DOCUMENTS

| | | | |
|---|---|---|---|
| 2005/0097294 A1* | 5/2005 | Hepkin | G06F 9/4812 711/170 |
| 2008/0215305 A1* | 9/2008 | Bishop | G06F 12/1009 703/15 |
| 2010/0191911 A1* | 7/2010 | Heddes | G06F 15/16 711/118 |
| 2011/0246727 A1* | 10/2011 | Dice | G06F 12/0261 711/150 |
| 2012/0131283 A1* | 5/2012 | Mital | G06F 12/084 711/144 |
| 2015/0178110 A1* | 6/2015 | Li | G06F 9/45558 718/1 |
| 2016/0055017 A1* | 2/2016 | Beveridge | G06F 9/45558 718/1 |
| 2016/0292072 A1* | 10/2016 | Edwards | G06F 12/0261 |
| 2019/0236749 A1* | 8/2019 | Gould | G06F 9/4881 |

* cited by examiner

*Primary Examiner* — Charles M Swift
(74) *Attorney, Agent, or Firm* — Greenblum & Bernstein, P.L.C.

(57) ABSTRACT

A system for and method of allocating and deallocating memory in a multiprocessing computing environment that improves the management of memory by the various processes and sub-processes in the multiprocessing environment are disclosed. The system and method improve the allocation and deallocation of memory for sub-processes that are limited to performing memory read operations.

17 Claims, 4 Drawing Sheets

FORK-AWARE SMART POINTERS

FIELD

The inventive concepts relate generally to systems for and methods of improving automatic memory management for programs operating in a multiprocessing environment.

BACKGROUND

Multithreading and multiprocessing are two different software execution models that are used to achieve concurrent processing. With multithreading, all of the threads in a program share a single copy of memory so any change made to memory by one thread is visible to all of the other threads. With multiprocessing, each process is provided with a private copy of the program's memory so that any change made by a process is visible only to the process that made the change. Multithreading is more memory efficient since there is only one copy of the program's memory regardless of the number of threads, but multithreading requires software to be designed for thread-safety. Many legacy software programs are not designed to be thread-safe, so the multiprocessing model is often used instead. However, this doesn't allow for the efficient memory use provided by multithreading.

In order to reduce memory usage in multiprocessing programs, some operating systems, such as Linux®, use a memory management optimization technique referred to as copy-on-write. With copy-on-write, sub-processes initially share parent process memory with no private memory, in a manner similar to multithreading. Memory is copied into the sub-process' private memory space only when the sub-process writes to memory. The more that a sub-process writes to memory, the more memory it uses. Multiprocessing programs are often designed to access memory in a read-only manner to minimize copy-on-writes. A common pattern is for an initial parent process to load or create common data and then initiate sub-processes which access this data in a read-only manner.

Certain programming languages implement a memory management process referred to as "garbage collection" that tracks memory usage and deallocates unused memory. Other programming languages implement a data type referred to as a smart pointer. Smart pointers automatically deallocate memory when it is no longer used, to free the programmer from having to manage memory manually. Smart pointers typically do this by maintaining a counter that tracks the number of independent references to memory. The reference count is incremented each time the program accesses the memory that the pointer manages and decremented when the access completes. When the reference count reaches zero in such implementations, the smart pointer deallocates the memory.

Operating systems, such as Linux®, are designed in a way that cause multiprocessing programs to use significantly less memory if they mostly read from memory and rarely write to memory. However, this is problematic in multiprocessing programs that use reference counting smart pointers. This is because smart pointers cause every access of the memory that is managed by the smart pointer to modify the reference count even if the memory is only being accessed for reading. Changing the reference count causes a copy-on-write into the sub-process' private memory. This copy-on-write operation causes inefficient use of memory in some multiprocessing programs that use smart pointers. What is needed is a system for and a method of minimizing the copy-on-write operations while still providing a method of managing memory usage.

SUMMARY

A smart pointer is modified to keep track of which process performed the original memory allocation, such that the smart pointer only changes the pointer reference count for memory actions initiated by that process. In all other processes that have a copy of a given smart pointer, the reference count is never changed. This avoids a copy-on-write to the sub-process caused by counters incrementing when memory is accessed for a read operation without changing the contents of the memory. In multiprocessing environments, sub-processes share memory with the parent process except for memory that has been modified. If a sub-process writes to memory, then a copy of the memory is made in the sub-process. Incrementing a counter is a memory write, so smart pointers that increment reference counters even for read-only memory accesses cause memory to be copied to the sub-process, causing two copies of the same memory to be created, one in the parent process and one in the sub-process. In certain circumstances, particularly those in which a sub-process operates on a large dataset, creating such copies can result in a large amount of memory usage and even lead to errors due to insufficient memory.

In an exemplary embodiment, the smart pointer keeps track of which process performed the original memory allocation and only changes the reference count in that process. In all other processes, the reference count is not changed. Since the counter is not modified, the memory that holds the counter is not written to, thus preventing a copy-on-write from causing memory to be copied to those cores that are performing read-only memory operations.

The exemplary embodiment has no cost as long as the process data is only accessed in a read-only manner. As long as each processor core does not modify this data, then private copies of the memory will not be made, and therefore there will not be any need to deallocate the memory used by the process data except by the core that originally allocated the memory. As a result, maintaining the counters for each sub-process is unnecessary as long as the process data is accessed by the core in a strictly read-only manner. In such an exemplary embodiment, if any process that is using this smart pointer other than the process that originally generated the operating data does modify the data, causing a copy-on-write operation, a memory leak may result. For example, if a process modifies the memory used to hold working data, then a private copy of the memory will be made for that process. Since the smart pointer is not maintaining the reference count for that process, the memory will not be freed, resulting in a potential memory leak. As a result, this solution is only applicable for memory that is strictly read only.

In another exemplary embodiment, a smart point is implemented such that the pointer reference counts for all smart pointers are located in a single data structure which is held in a location that is separate from the memory that the smart pointers manage, such that a copy-on-write caused by a change in the reference count only copies the smart pointers and not the memory to which the smart pointers manage. In such instances, copy on writes will still occur, but only the data structure that contains the smart pointer reference counts will be copied, and this is likely to be more compact than the memory that the smart pointers reference.

The above and other aspects and advantages of the general inventive concepts will become more readily apparent from the following description and figures, illustrating by way of example the principles of the general inventive concepts.

BRIEF DESCRIPTION OF THE DRAWINGS

These and other features of the general inventive concepts will become better understood with regard to the following description and accompanying drawings in which.

DETAILED DESCRIPTION

This detailed description merely describes exemplary embodiments of the invention and is not intended to limit the scope of the invention in any way. Indeed, the contemplated invention is broader than the exemplary embodiments. The terms used in any future claims have their full ordinary meaning unless an express definition is provided herein.

Figure 1:
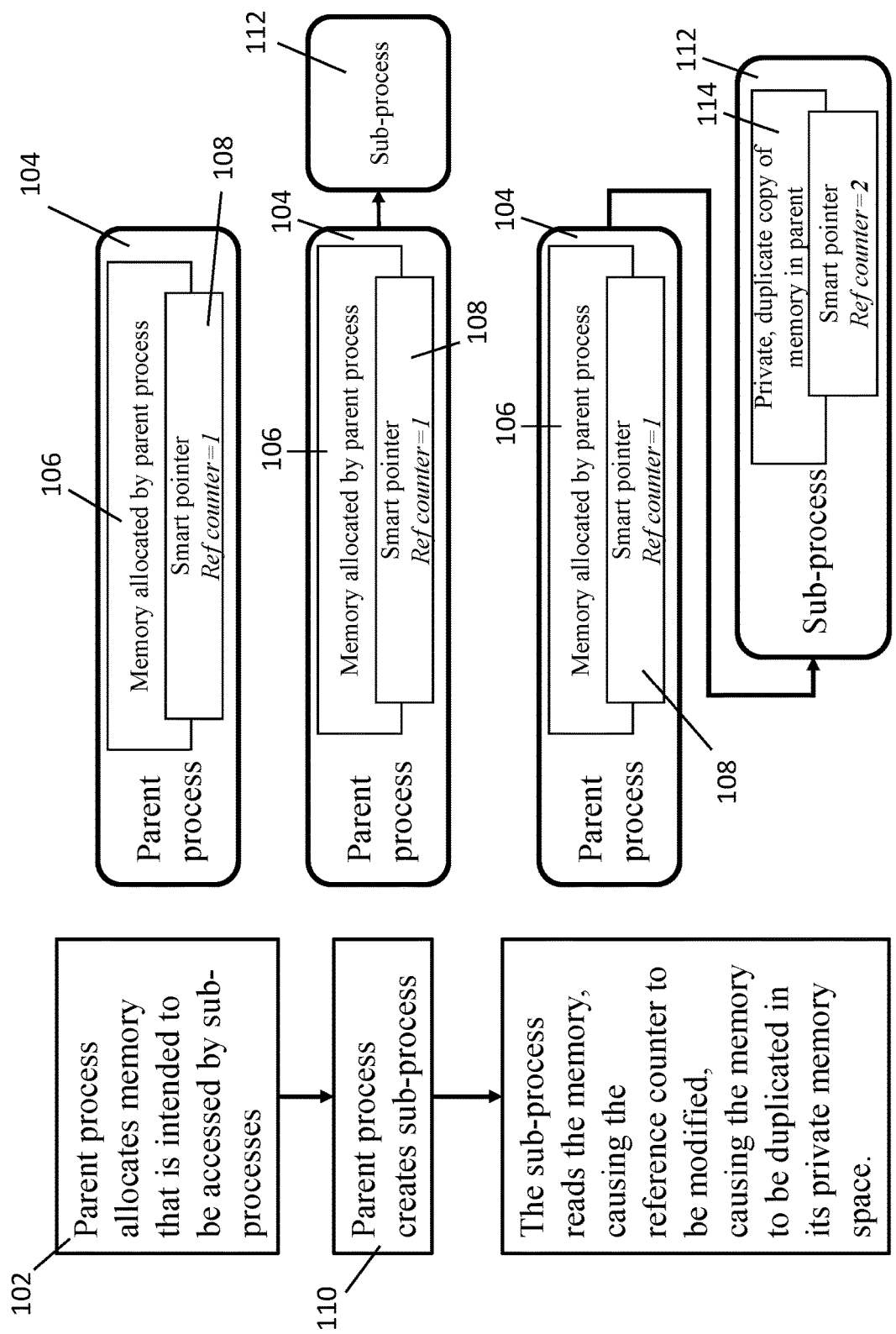
FIG. 1 is a diagram of a conventional memory management system using smart pointers.

Smart pointers are a known construct in computer science for allocating memory. An illustration of the steps taken by a software program that implements conventional smart pointers is shown in FIG. 1. In step 102, a parent process 104 allocates memory 106 that is intended to be accessed by sub-processes. An ordinary smart pointer 108 is created with an initial reference count of 1. In step 110, the parent process 104 creates a sub-process 112. In the illustrated example, the sub-process 112 accesses the allocated memory 106. Even if this access is a read-only access, an ordinary smart pointer 108 increments to a count of 2 because the sub-process 112 accesses the allocated memory 106. Because the ordinary smart pointer 108 is stored in the allocated memory 106, incrementing the ordinary smart pointer 108 causes a write to the allocated memory 106 (a copy on write) which results in a private (working) copy 114 of the allocated memory 106 being created. This allocation is potentially an undesirable and inefficient use of memory. This may be particularly the case when the amount of allocated memory 106 required is large.

In an exemplary embodiment, the smart pointer keeps track of which process performed the original memory allocation, and it only changes the reference count in that process. In all other processes, the reference count is not changed. For example, a smart pointer was modified to keep track of which process originally loaded the data used by that process, and to only maintain the counter for that process. For all other processes, the counter is not modified. Since the counter is not modified, the memory that holds the counter is not written to, thus preventing memory from being copied to those processes that are performing read-only memory operations as the result of a copy-on-write.

An exemplary modified smart pointer does not increase execution cost as long as the process data is only accessed in a read-only manner. So long as each process never modifies this data, private copies of the memory will never be made, and therefore, there will never be any need to deallocate the memory used by the process data except by the process that originally allocated the memory. Thus, maintaining the counters for each sub-process is unnecessary as long as the process data is accessed in a strictly read-only manner. Note that if any process that is using this smart pointer other than the process that originally generated the simulated market does modify the data, the result will be a memory leak. If a process modifies the memory used to hold working data, then a private copy of the memory will be made for that process. Since the smart pointer is not maintaining the reference count for this process, the memory may never be freed, and the result will be a memory leak. Therefore, this solution is generally only applicable for memory that is strictly read-only.

Figure 2:
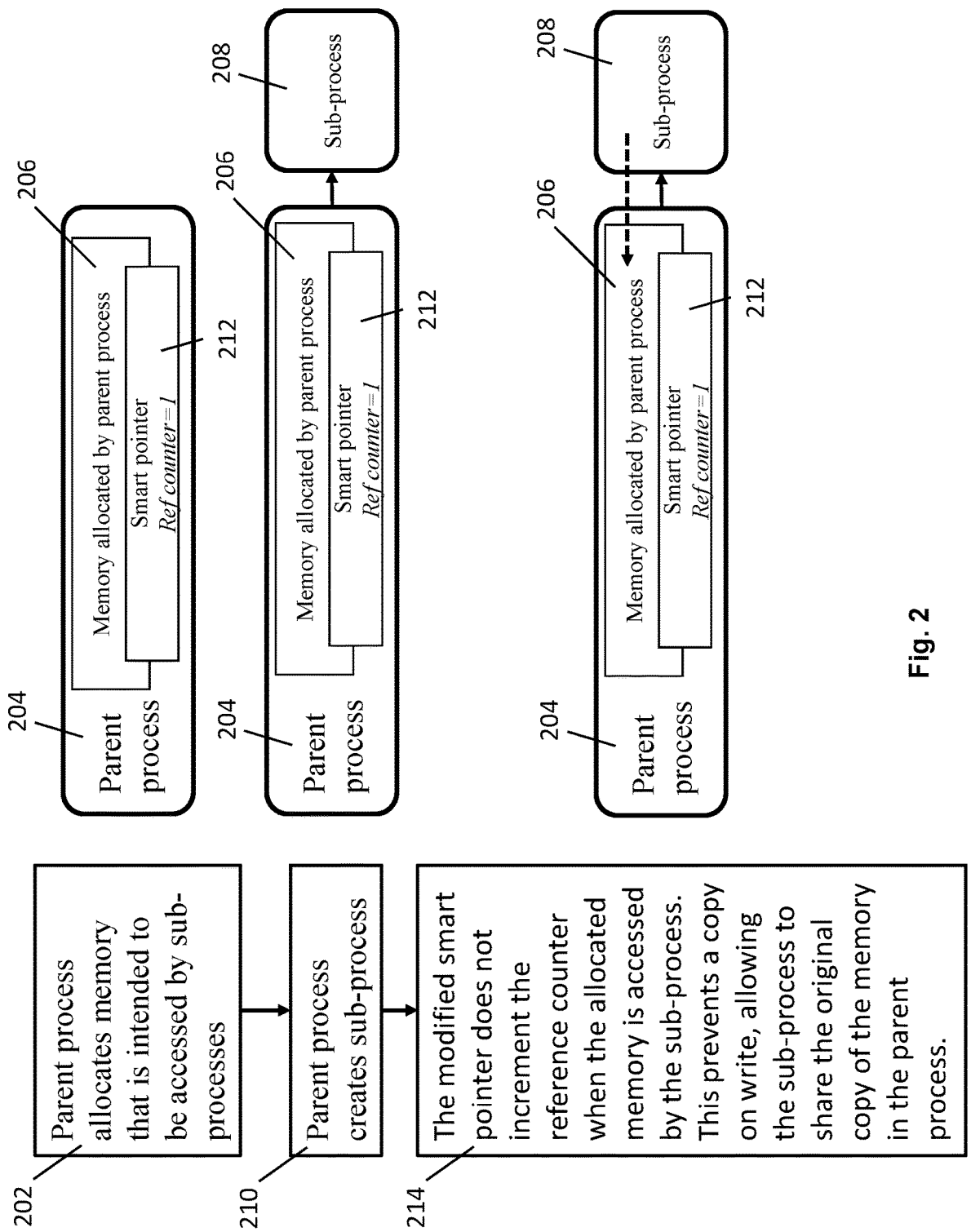
FIG. 2 is a diagram illustrating a memory management system using smart pointers that control the allocation of memory according to an exemplary embodiment in which sub-processes don't deallocate memory that was originally allocated by the parent process.
Figure 3:
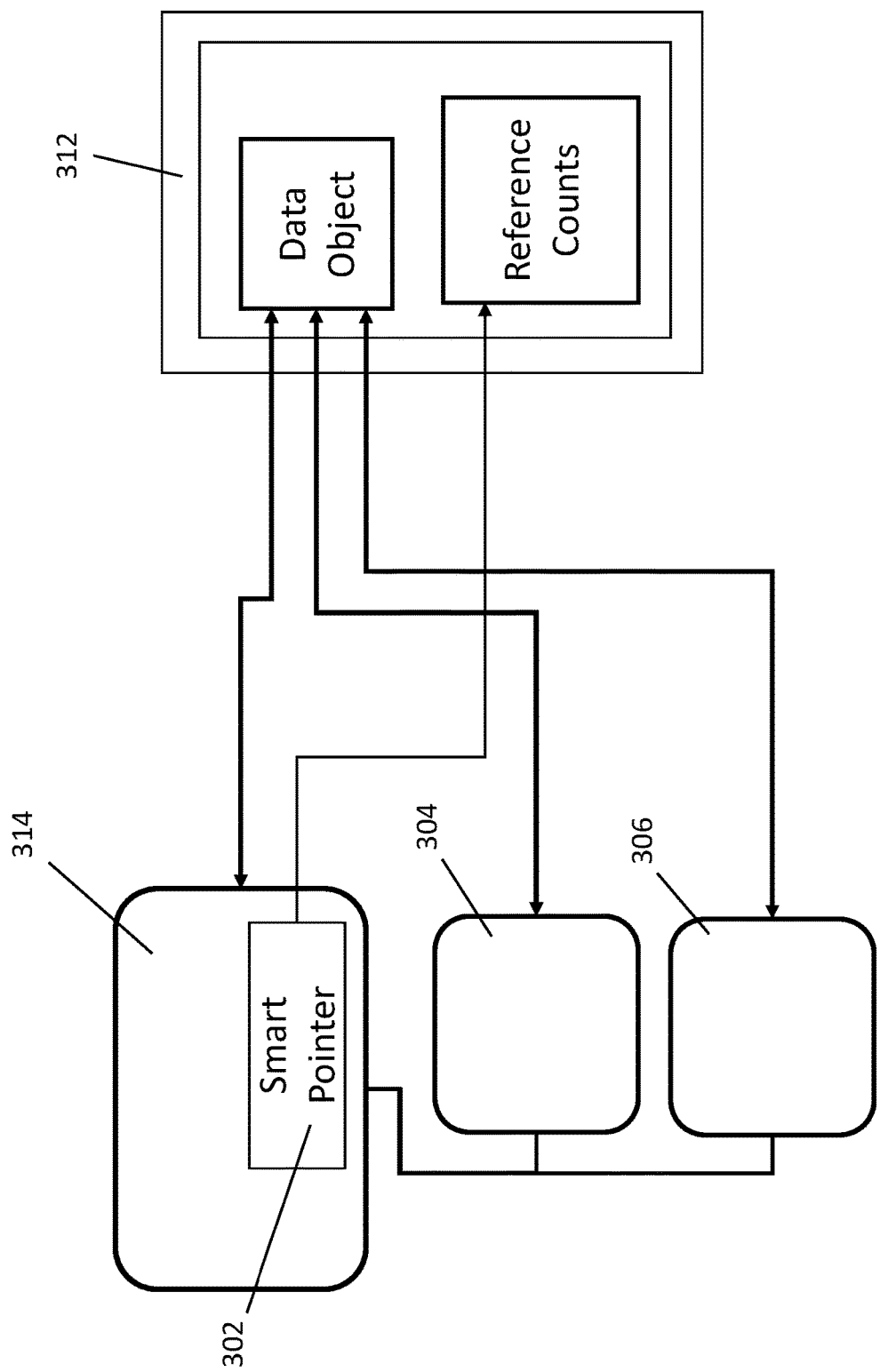
FIG. 3 is a diagram illustrating use of a smart pointer for controlling the allocation of memory according to an exemplary embodiment in which multiple sub-processes don't deallocate memory that was originally allocated by the parent process.

As is illustrated in FIG. 2, in step 202 a parent process 204 allocates a copy of memory 206 that contains data which is intended to be accessed in a read-only manner by a sub-process 208. As illustrated at step 210, the parent process 204 spawns a sub-process 208. However, in an exemplary embodiment, the modified smart pointer 212 is configured such that it doesn't increment when the sub-process 208 accesses the copy of memory 206. Thus, as illustrated in step 214, the modified smart pointer 212 isn't incremented when the copy of memory 206 is accessed. The result, is that there is no write to allocated memory to increment the modified smart pointer 212 and thus, no copy-on-write as is the case with the implementation of the ordinary smart pointer 108 as illustrated in FIG. 1. In an exemplary embodiment, the sub-process continues to access the copy of memory 206. The result is that only the copy of memory 206 created by the parent process 204 is required, thus reducing memory usage. The modified smart pointer 212 is used by the parent process 204 to track memory usage and deallocate the copy of memory 206 when the parent process 204 has completed. This reduction is even more significant in the case of a plurality of sub-processes. As shown in FIG. 3, a first 304 and second 306 sub-process accesses a shared memory 312 in a read-only manner. Because there is no write activity by the sub-processes (304 and 306), the exemplary embodiment does not modify the smart pointer's 302 reference counter for either of the first 304 or second 306 sub-processes. As a result there is no copy-on-write taking place.

Conventional smart pointers will modify the reference counter memory usage regardless of whether the shared memory 312 is being accessed by the parent process 314 that originally allocated the memory 312 or by a sub-process (304 or 306). In the illustrated exemplary embodiment, the smart pointer 302 tracks only the shared memory 312 accesses of the parent process 314 and not that of the sub-processes (304 and 306). Thus, when the parent process 314 completes its use of the shared memory 312, the smart pointer 302 causes the shared memory 312 to be released. Note that in the illustrated exemplary embodiment, the sub-processes (304 and 306) must access shared memory 312 only in a read-only manner. If any sub-process (304 or 306) writes to the shared memory 312 that is managed by this smart pointer 302, the operating system will cause a copy-on-write to occur, causing a copy of the shared memory 312 to be made for the sub-process (304 and 306). Since the smart pointer 302 is not tracking memory accesses in the sub-processes (304 and 306), this copied memory will never be deallocated, resulting in a memory leak. This arrangement avoids a build-up of unused but still allocated memory (resulting in a memory leak). This embodiment is applicable when the sub-processes only address a shared memory 312 in a read-only fashion. In an exemplary embodiment, the smart pointer does nothing to prevent the non-allocating process from writing to memory.

In an exemplary embodiment, a smart pointer detects forks by determining the current process identifier ("ID"). This can be done by using a system call such as "getpid( )." When memory is originally allocated, the exemplary embodiment calls getpid( ) to store the process ID of the allocating process. For each subsequent access of the memory, the exemplary embodiment calls getpid( ) to determine if the process ID is different from the ID of the originally allocating process. If the ID is different, a fork is detected.

Figure 4:
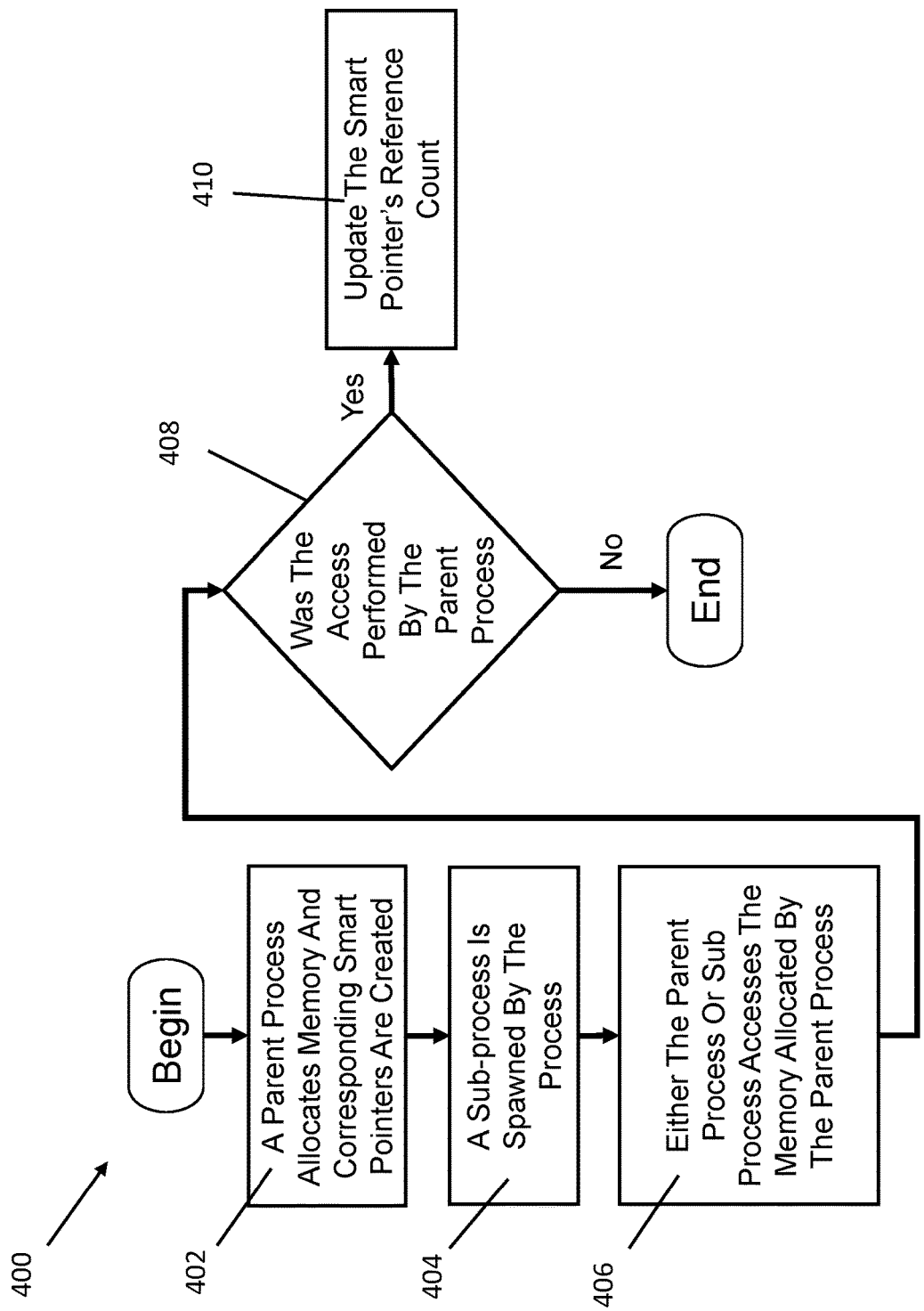
FIG. 4 is a flow chart of the steps taken by an exemplary embodiment to manage memory using modified smart pointers.

FIG. 4 is a flow chart 400 illustrating the steps performed by an exemplary embodiment. In step 402, a parent process is initiated along with a smart pointer associated with the process. In step 404, a sub-process is spawned by the parent process. In step 406, a parent or sub process access memory allocated by the parent process. In step 408 the embodiment checks to see if the memory access was performed by the parent process, if so, then in step 410, the pointer is updated to reflect that activity. If the access was performed by the sub process, the pointer reference is not updated. In an exemplary embodiment, step 406 is repeated when another access is made to memory. If there is a need for the sub-process to write to memory, the smart pointer is configured such that it tracks only the parent process and ignores any memory activity by sub-processes. If sub-processes are required to perform write operations, additional smart pointers are created such that they reflect memory activity of each sub-process spawned by the process. As the exemplary embodiment performs its intended function, the smart pointers monitor usage by the process and sub-processes. In certain exemplary embodiments in which sub-processes (304 and 306) write to the shared memory 312, each smart pointer accesses its counts from a location separate from the smart pointers themselves to avoid copy-on-writes to the process and sub-process working memory.

While the present invention and associated inventive concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the invention, in its broader aspects, is not limited to the specific details, the representative apparatus, and illustrative examples shown and described. Accordingly, departures may be made from such details without departing from the spirit or scope of the general inventive concepts.

What is claimed is:

1. A method of managing memory in a multiprocessing environment, the method comprising:
   initiating a first program process;
   allocating a first memory space to the first program process;
   initializing a first pointer, wherein the first pointer is configured to keep track of which process performs the allocating the first memory space and to only change a count value for memory actions that are initiated by that process;
   associating the first pointer with the first program process;
   adjusting the count value by the first pointer according to a number of accesses of the first memory space by the first program process;
   initiating a first sub-process with access to the first memory space without allocating a second memory space to the first sub-process;
   preventing the adjustment of the count value by the first pointer as the result of a memory access by the first sub-process;
   monitoring the count value stored by the first pointer to determine if the count value reaches a predetermined value; and
   deallocating the memory space if the count value stored by the first pointer reaches the predetermined value and there are no additional pointers associated with the first memory.

2. The method of claim 1, wherein the predetermined value equals zero.

3. The method of claim 1, wherein the first sub-process is limited to read-only memory access.

4. The method of claim 1, further comprising:
   initiating a second sub-process with access to the first memory space without allocating a second memory to the second sub-process; and
   preventing the adjustment of the count value as the result of a memory access by the second sub-process.

5. The method of claim 1, wherein the preventing the adjustment of the pointer as the result of a memory access by the first program subprocess comprises:
   storing an identifier representing the first program process;
   identifying a program process performing a memory access upon detecting the memory access;
   comparing the stored identifier with the identity of the program process performing the memory access; and
   adjusting the count value only if the program process performing the memory access is the first program process.

6. The method of claim 5, where the identifying a program process performing the memory access comprises executing a get program ID system call.

7. The method of claim 1, further comprising:
   initializing a second pointer;
   associating the second pointer with the first sub-process;
   adjusting a count value stored by the second pointer according to a number of accesses of the first memory space by the first sub-process;
   monitoring the count value stored by the second pointer to determine if the count value reaches a predetermined value; and
   deallocating the memory space if the count values of the first pointer and second pointer reach the predetermined value.

8. The method of claim 1, wherein the first pointer is locating within the first memory space.

9. A system for managing memory in a multiprocessing environment, the system comprising:
   a first processor core;
   a first process operating on the first processor core;
   a first memory space in communication with the first processor core, the first memory space allocated to the first process;
   a first pointer associated with the first process, wherein the first pointer is configured to keep track of which process performs an allocation of the first memory space and to only change a count value for memory actions that are initiated by that process;
a first sub-process in communication with the first memory space where the first sub-process does not have a memory allocation;
instructions that, when executed by the processor core:
adjust the count value by the first pointer to reflect accesses of the first memory space by the first program process;
prevent the adjustment of the count value by the first pointer as the result of a memory access by the first sub-process;
monitor the count value to determine if the first pointer reaches a predetermined value; and
deallocate the first memory space by disassociating the first memory space from the first program process if the first point reaches the predetermined value.

10. The system of claim 9, wherein the predetermined value equals zero.

11. The system of claim 9, wherein the first sub-process is limited to read-only memory access.

12. The system of claim 9, further comprising:
a second sub-process with access to the first memory space where the second sub process does not have a memory allocation; and
instructions that when executed by the processor core:
prevent the adjustment of the count value stored by the first pointer as the result of a memory access by the second sub-process.

13. The system of claim 9, wherein the instructions, when executed by the processor core, cause the preventing the adjustment of the pointer as the result of a memory access by the first program subprocess, perform:
storing an identifier representing the first program process;
identifying a program process performing a memory access upon detecting the memory access;
comparing the stored identifier with the identity of the program process performing the memory access; and
adjusting the first pointer only if the program process performing the memory access is the first program process.

14. The system of claim 13, where the identifying a program process performing the memory access comprises executing a get program ID system call.

15. The system of claim 9, further comprising:
a second pointer associated with the first sub-process;
instructions that when executed by the processor core:
adjust a count value stored by the second pointer according to a number of accesses of the first memory space by the first sub-process;
monitor the count value stored by the second pointer to determine if the count value reaches a predetermined value; and
deallocate the memory space if the count values of the first pointer and second pointer reach the predetermined value.

16. The system of claim 9, wherein the first pointer is located in the first memory space.

17. A system for managing memory in a multiprocessing environment, the system comprising:
a first processor core;
a first process operating on the first processor core;
a first memory space in communication with the first processor core, the first memory space allocated to the first process;
a first pointer associated with the first process and located in the first memory space, wherein the first pointer is configured to keep track of which process performs the allocation of the first memory space and to only change a first count value for memory actions that are initiated by that process;
a first sub-process in communication with the first memory space where the first sub process does not have a memory allocation;
a second pointer associated with the first sub-process and located in the first memory space, wherein the second pointer is configured to keep track of which sub-process performs the allocation of the first memory space and to only change a second count value for memory actions that are initiated by that sub-process;
a second sub-process with access to the first memory space where the second sub-process does not have a memory allocation;
instructions that, when executed by the processor core:
adjust the first count value by the first pointer to reflect accesses of the first memory space by the first program process;
adjust the second count value by the second pointer to reflect accesses of the first memory space by the first sub-process;
prevent the adjustment of the first count value by the first pointer as the result of a memory access by the first subprocess by:
storing an identifier representing the first program process;
identifying a program process performing a memory access upon detecting the memory access;
comparing the stored identifier with the identity of the program process performing the memory access; and
monitoring the first count value to determine if the first count value reaches a value of zero;
monitor the second count value by the second pointer to determine if the second count value reaches a predetermined value;
deallocate the first memory space by disassociating the first memory space from the first program process if the first and second count values of the first pointer and second pointer reach the predetermined value; and
prevent the adjustment of the first count value by the first pointer to reflect accesses of the first memory space as the result of a memory access by the second sub process.

* * * * *